United States Patent [19]

Leavens, Jr.

[11] 3,808,447

[45] Apr. 30, 1974

[54] PHOTOELECTRIC SCANNING DEVICE USING DIFFUSE AND SPECULAR REFLECTION

[75] Inventor: William B. Leavens, Jr., West Orange, N.J.

[73] Assignee: Wilkata Codes, Inc., Kearny, N.J.

[22] Filed: July 19, 1973

[21] Appl. No.: 380,918

Related U.S. Application Data

[63] Continuation of Ser. No. 148,060, May 28, 1971, abandoned.

[52] U.S. Cl. .............. 250/569, 250/223 R, 250/239

[51] Int. Cl. .............. G08c 9/06

[58] Field of Search .. 250/219 D, 219 DC, 219 DD, 250/219 Q, 219 QA, 223, 219 WD, 219 LQ, 239, 566, 568, 569, 570; 235/61.11 E

[56] References Cited

UNITED STATES PATENTS

| | | | |
|---|---|---|---|
| 1,917,379 | 7/1933 | Lowry | 356/212 X |
| 3,446,978 | 5/1969 | Leavens, Jr. | 250/223 X |
| 3,518,440 | 6/1970 | Hanson et al. | 235/61.11 E |
| 3,581,100 | 5/1971 | Milford | 250/219 X |
| 3,035,380 | 5/1962 | Leavens | 250/219 D X |
| 3,483,388 | 12/1969 | Ogle et al. | 250/219 D |
| 3,402,299 | 9/1968 | Held | 250/219 D |
| 3,087,141 | 4/1963 | Steinbuch et al. | 250/219 D X |
| 3,431,426 | 3/1969 | Laidlaw | 250/219 D |

*Primary Examiner*—Walter Stolwein
*Attorney, Agent, or Firm*—Leo C. Krazinski

[57] ABSTRACT

A photoelectric scanning device having a single light source and a single scanning path for sensing code lines, as by diffuse reflection, and for sensing presence of the object bearing the code lines, as by specular reflection, from the same light source.

2 Claims, 6 Drawing Figures

INVENTOR.
William B. Leavens, Jr.,
BY Leo C. Krazinski
ATTORNEY

INVENTOR
William B. Learens, Jr.,
BY
Leo C. Krazinski
ATTORNEY

PHOTOELECTRIC SCANNING DEVICE USING DIFFUSE AND SPECULAR REFLECTION

This is a continuation of application Ser. No. 148,060 filed May 28, 1971, now abandoned.

BACKGROUND OF THE INVENTION

1. Field of the Invention

The present invention relates to an improved photoelectric scanning device for automatically inspecting code bearing articles, such as cartons, labels and the like.

2. Description of the Prior Art

In U.S. Pat. No. 3,035,380, the use of scanners for reading code lines on printed matter, by reflected light, is described. The scanning function was concerned solely with reading lines to provide pulses which were fed into a predetermined counter. The interrogation at the completion of the scanning was internal and was accomplished by a "reset within a predetermined time interval". At that time it was known that this interrogation function could also have been accomplished externally by separately scanning a path which contained no lines to provide holding while counts were being accumulated. In scanning a single row of code lines this generally required two light sources. It also was wasteful as, for the same reliability, it required a widened strip to provide the two scanning paths — one with code lines, the other clear. This external method did have the advantage that machines could be jogged or stopped on code lines without triggering a reset until a complete reading had been made.

My present invention makes it possible to combine the line reading function with the external control function in a single scanning path with a single light source. This is made possible because of the use of "specular reflection" and "diffuse reflection" in my scanning device. As discussed in Kent's Mechanical Engineers' Handbook — 12th Edition, page 27–68, — "Reflection may be of several types, the most common of which are specular (regular), diffuse, spread, and mixed." We are concerned here with specular reflection and diffuse reflection. In specular reflection the angle of incidence is equal to the angle of reflection; while in diffuse reflection the maximum purity is perpendicular to the surface.

SUMMARY OF THE INVENTION

Accordingly, an object of the invention is to provide an improved photoelectric scanning device for automatically scanning coded objects by the use of specular reflection and diffuse reflection with a single source of light.

A further object of the invention is to provide such a scanning device that is simple, practical and economical in construction, and is reliable in operation.

Other and further objects will be obvious upon an understanding of the illustrative embodiment about to be described, or will be indicated in the appended claims and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

Referring now to FIG. 1 there is shown schematically a light source such as lamp 11 in which an image 10 of the filament in lamp 11 is focused on a scanning path by means of a lens system 12. An angle of incidence of 40° from the perpendicular has been found satisfactory. Equally satisfactory has been found an angle of 50° from the perpendicular for diffuse reflection scanning of the printed code bars by phototube 13 on the screen of which the light from image 10 is focused by lens 14.

Lucite tube 15 is set with its axis at an angle of 40° from the perpendicular, equaling the angle of incidence, and centered on image 10. Solar cell 16, which is attached to one end of tube 15, gathers the specular reflection of light through tube 15 to provide the holding current so long as an object 18 scanned is in position to receive specular reflection from image 10.

Figure 1:
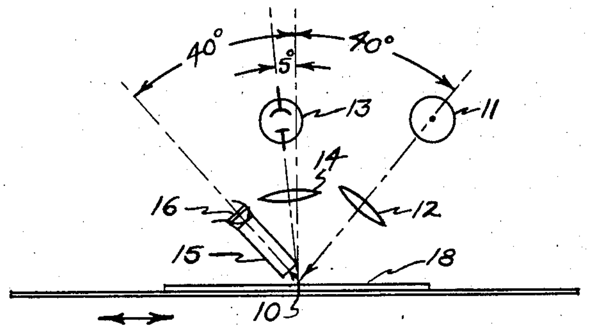
FIG. 1 is a schematic view of apparatus embodying the present invention.
Figure 2:
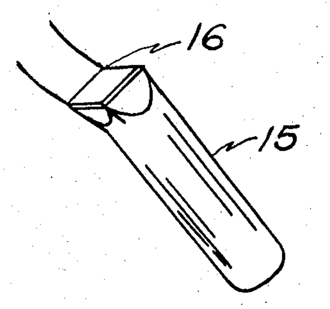
FIG. 2 is a perspective view of the element used for sensing specular reflection.
Figure 5:
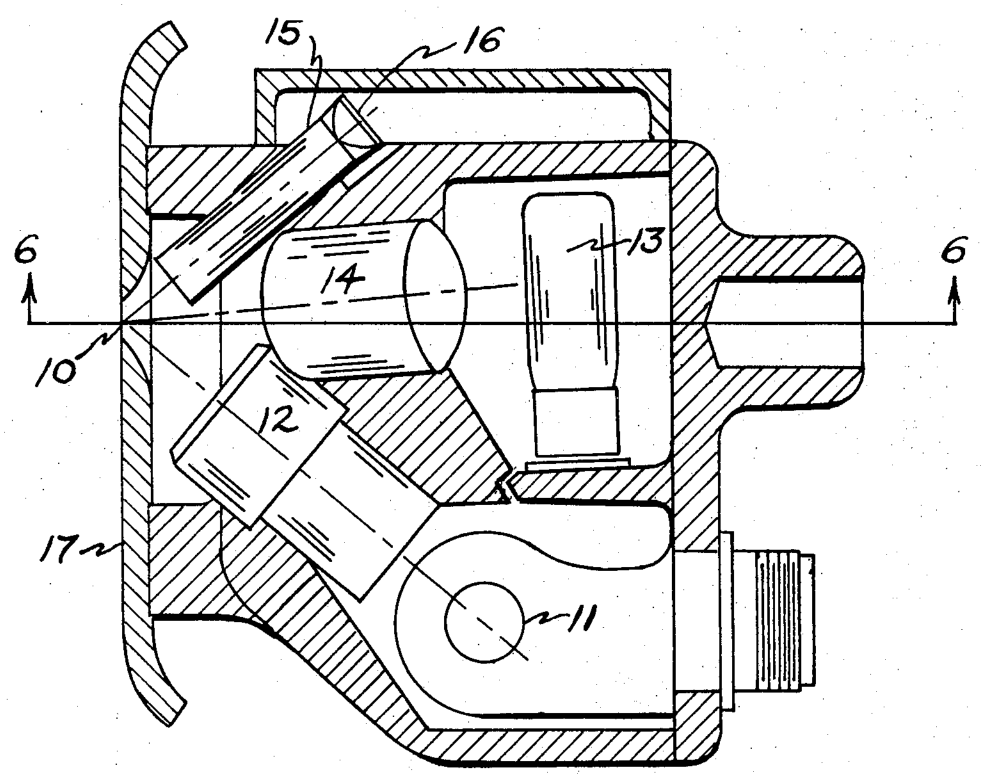
FIG. 5 is a sectional view of a scanner assembly housing the elements shown in FIG. 1.

FIG. 2 shows in detail this scanning element for receiving specular reflection in which the solar cell 16 has the dimension 0.4 × 0.4 inch (square). The Lucite tube 15 is reduced in size from the same size square of 0.4 × 0.4 inch to a 0.375 inch diameter to permit the tube to be inserted into a hole drilled in the scanner and, for maximum effect, to reach down close to the light image 10 to gather not only the light from the spot (the image from lamp 11 is typically three-thirty-seconds inch × one-thirty-second inch but also the stray light around the image. The elements of FIG. 1 and FIG. 2 are shown mounted in a single unit in FIG. 5 where bar 17 provides a guide for a passing scanned object 18 to insure that the image 10 is in focus on the code lines (not shown).

Figure 3:
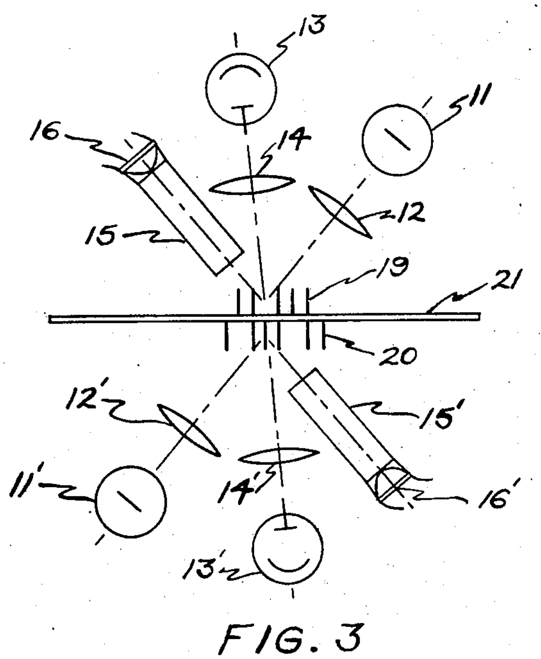
FIG. 3 is a typical two row line code embodying the present invention.

In FIG. 3 there are schematically shown a two row code with code lines 19 and 20 and two sets of scanning elements, each set being that shown in FIG. 1 and disposed at opposite sides of a shield 21 for confining light from the lamps 11 and 11′ to their respective scanning elements. Both sets of scanning elements can be mounted in a single unit in a manner similar to that disclosed in U.S. Pat. No. 2,872,590.

Figure 4:
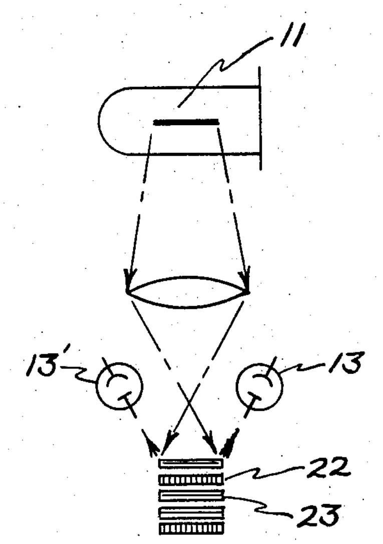
FIG. 4 is a typical two color line code embodying the present invention.
Figure 6:
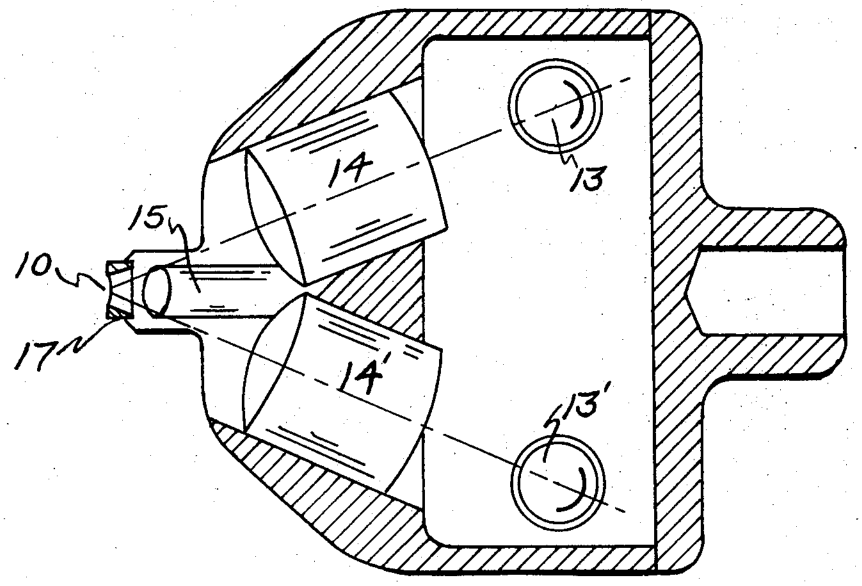
FIG. 6 is a variation of scanner taken substantially along line 6—6 of FIG. 5 showing an arrangement with three light gathering elements.

In FIG. 4 is schematically shown a two color code utilizing the invention herein for conditions where more code combinations are needed, being an improvement over the color code arrangement shown in U.S. Pat. No. 3,035,380. For clarity and to simplify the showing of FIG. 4 the solar cell 16 is not shown. Code lines 22 and 23 are photoelectrically distinguishable as, for example, code line 22 being black and code line 23 being red. This code can be read by using a second phototube 13' mounted in a scanner casing, as in FIG. 6, shown as a cross-sectional view taken along the line 6—6 in FIG. 5. For phototube 13, a 927 phototube may be used to read the black lines 22 and for phototube 13', a 5583 phototube may be used to read the red lines 23 and also the black lines 22. Thus, referring to FIG. 6 the light image is seen three times, as a diffuse reflection of light by phototube 13 and 13' and as a specular reflection of light by the solar cell 16 (not shown) mounted on the outer end of tube 15 (FIG. 6). The three resultant currents are fed into known predetermined counters and interrogate and reset control circuits. The multiple viewing of the lamp image provides increased reliability. The space-conserving single scanning path eliminates difficulties caused by misalignment of code lines due to printing or cutting misregister or to the shifting, during transport, of the object being scanned when two or more paths are required. While not essential, the lamp current may be monitored by known techniques to provide a fail safe signal in the event of filament breakage.

Elemental is a single row of code lines. When a greater number of combinations is needed, the single scanning path is used with the two color code shown in FIG. 4. If a still greater number of combinations is needed, the multiple row code shown in FIG. 3 is available with greater security in the same space resulting from the elimination of a third holding path. The dual scanner used for such a code requires that the holding element (solar cell 16), shown in FIG. 2, operate on one of the rows though two such elements may be paralled for increased protection.

As various changes may be made in the form, construction and arrangement of the parts herein, without departing from the spirit and scope of the invention and without sacrificing any of its advantages, it is to be understood that all matters are to be interpreted as illustrative and not in any limiting sense.

I claim:

1. A photoelectric scanning device for inspecting articles having code marks of spaced lines arranged in a row for providing alternate dark and light portions as the articles move across an inspection point comprising, in combination, a scanning system including a single light source for projecting a light image on said moving articles, each of said articles having a single row of said spaced lines, a first photoelectric sensitive cell responsive to diffuse reflection from said row of spaced lines of said light image upon said moving alternate dark and light portions for generating corresponding electric pulses to be fed into a counter, and a second holding photoelectric sensitive cell responsive to specular reflection from said row of spaced lines of said light image upon said moving dark and light portions for generating a single holding electric pulse for each of said articles, said photoelectric cells being independent of each other.

2. A photoelectric scanning device according to claim 1, including a casing for containing at least two photoelectric sensitive cells responsive to diffuse reflection.

* * * * *